Figure 1:
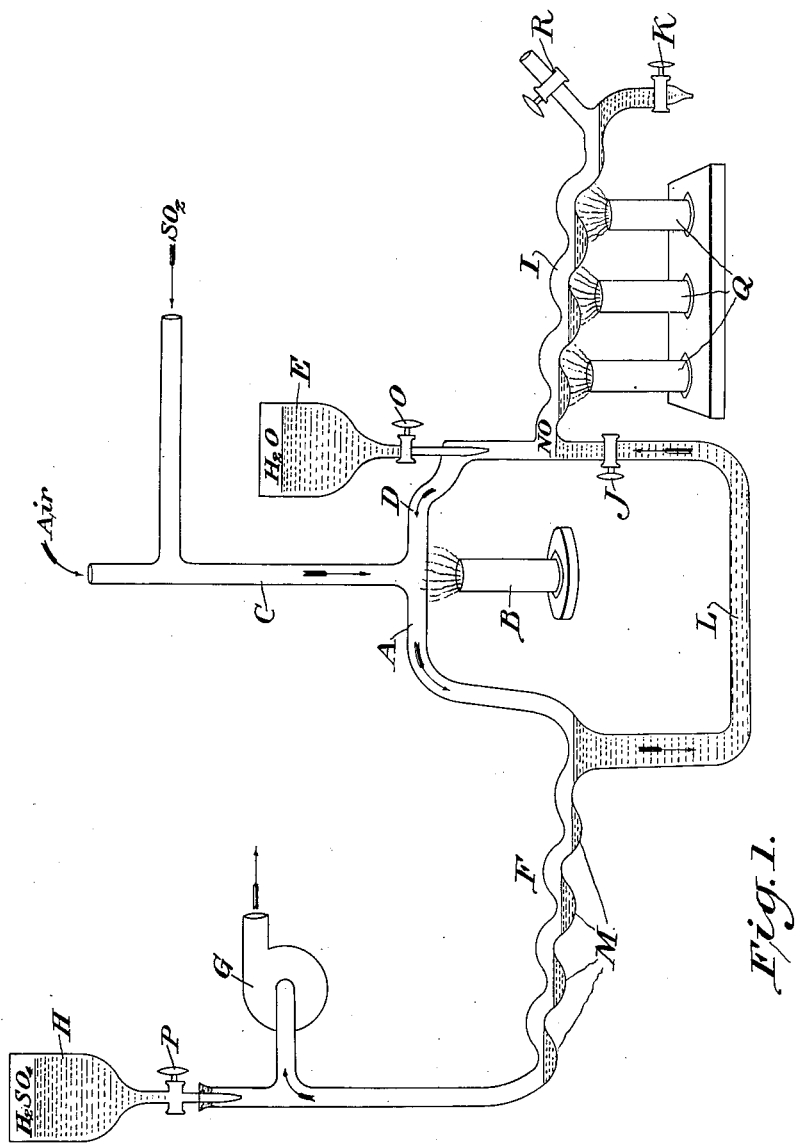

C. J. REED.
PROCESS OF MAKING SULFURIC ACID.
APPLICATION FILED AUG. 21, 1918.

1,363,918.

Patented Dec. 28, 1920.
2 SHEETS—SHEET 1.

Inventor
Charles J. Reed
By Byrnes Townsend & Breckinstein,
Attorneys

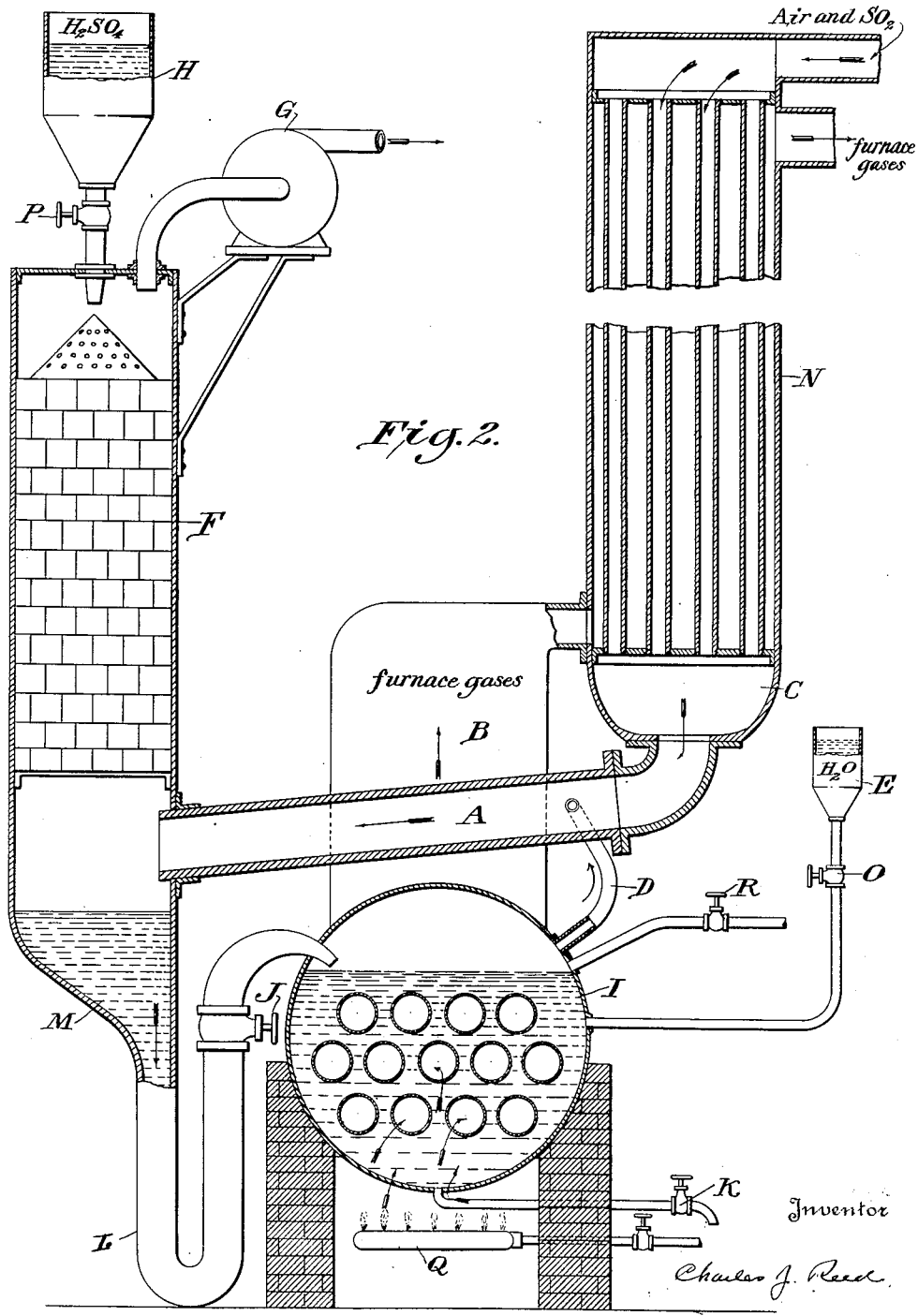

UNITED STATES PATENT OFFICE.

CHARLES J. REED, OF GLENSIDE, PENNSYLVANIA.

PROCESS OF MAKING SULFURIC ACID.

1,363,918.     Specification of Letters Patent.     Patented Dec. 28, 1920.

Application filed August 21, 1918. Serial No. 250,833.

*To all whom it may concern:*

Be it known that I, CHARLES J. REED, a citizen of the United States, residing at Glenside, in the county of Montgomery and State of Pennsylvania, have invented certain new and useful Improvements in Processes of Making Sulfuric Acid, of which the following is a specification.

The present invention relates to process of manufacturing sulfuric acid, and comprises an improved process whereby concentrated sulfuric acid may be directly prepared.

In the ordinary process of making sulfuric acid by what is known as the "lead chamber process" the sulfur dioxid is mixed with air, higher oxids of nitrogen, and steam, the ensuing reaction producing dilute sulfuric acid and nitric oxid. The nitric oxid in contact with the atmospheric oxygen present absorbs oxygen and is converted into nitric peroxid, and thus by a cyclic action acts as a carrier of oxygen. In this process the steam also acts to prevent the formation of solid compounds of sulfur trioxid with oxids of nitrogen, which compounds would otherwise collect in a crystalline mass and interfere with the operation of the process. The dilute sulfuric acid formed as above is subsequently concentrated by evaporation. Therefore, in this lead chamber process, there is in the first stage a dilution by water condensed from the introduced steam; and in the final stage an evaporation to get rid of this water.

In my improved process I avoid the introduction of steam and the consequent necessity of evaporation to get rid of the water.

In my improved process I introduce into a reaction chamber, a mixture of sulfur dioxid, an excess of air, and the requisite amount of nitric oxid or other higher oxids of nitrogen for the oxidation of the sulfur dioxid, but no steam or water other than that which may incidentally, as moisture, accompany the gaseous reagents. I may either preheat the gases or otherwise maintain the temperature of the reaction chamber above the vaporizing temperature of all compounds of sulfur, oxygen, and nitrogen, whereby I cause to be produced in the reaction chamber, and to be maintained in the gaseous state therein, a compound or compounds of sulfur trioxid with an oxid of nitrogen. By means of a suitable circulating apparatus I cause the mixture of gases and vaporized compounds to flow out of the reaction chamber and to pass through or come in contact with concentrated sulfuric acid, by which the compound of sulfur trioxid and nitrogen oxid, and any residual oxids of nitrogen, are absorbed and removed from the current of outflowing gases. The outflowing gases, therefore, consists only of residual oxygen and nitrogen from the excess of air originally used. The solution of the sulfur trioxid compound in the concentrated sulfuric acid is maintained at a temperature sufficiently high to prevent solidification, and is subsequently, preferably in another apparatus, treated while hot with the exact amount of water required to liberate the oxid of nitrogen and to form concentrated sulfuric acid. The amount of water necessary will be 18 pounds for each 32 pounds of sulfur or 64 pounds of sulfur dioxid used. The oxid of nitrogen is recovered and re-used. It will be seen that in this process there is no dilution by water in the forming reaction, and hence no evaporation is necessary at a subsequent stage. The small amount of aqueous vapor introduced with the air does not interfere with the practical operation.

My process may be carried out in apparatus of any suitable type, but for a full understanding of the invention I have shown certain forms of apparatus in the accompanying drawings, wherein:

Figure 1 is a diagrammatic view indicating the operation in accordance with my process; and Fig. 2 is a vertical sectional view of one form of apparatus functioning in a like manner, but illustrating means for economizing the heat requirements of the process.

Referring to Fig. 1, A represents the reaction chamber maintained at the proper operating temperature by any source of heat indicated at B. This chamber may be tubular as shown, or of any suitable form, and is constructed of any suitable material, such for example as burned clay or the like, which is capable of resisting nitric and sulfuric acids and the oxids of nitrogen and sulfur, and capable also of resisting boiling concentrated sulfuric acid. This chamber is connected with an inlet tube C, through which air and sulfur dioxid are admitted, either separately or in the form of burner gas; also with a tube D, through which oxids of nitrogen are admitted, such oxids being derived in the continuous operation of the process largely from the denitrification of the first reaction product. E is a reservoir containing water and having at its bottom an outlet tube controlled by a valve O. G is a suction device for maintaining the necessary movement of gases through the system. H is a reservoir containing concentrated sulfuric acid, and having an outlet pipe at its bottom, controlled by a valve P. I is a vaporizing apparatus communicating with the reaction chamber A through the tube D, and communicating also, through a tube L provided with a valve J, with the condensing system F, in which a plurality of bodies of concentrated sulfuric acid are illustrated at M. K is a control valve for the acid produced. Q represents any suitable source of heat for heating the varorizing apparatus I. R is an inlet valve by which air may be introduced at will.

The operation of the above apparatus is as follows:

The several control valves illustrated are closed and the suction device G is operated to produce a partial vacuum in the system, thereby causing air, sulfur dioxide, and the higher oxids of nitrogen to be drawn into the reaction chamber A through the tubes C and D, and the residual gases to be drawn from the reaction chamber through the condenser F, and thence discharged into the atmosphere. In the heated reaction chamber, preferably maintained at a temperature of about 200° to 400° C., the atmospheric oxygen, the higher oxids of nitrogen, and the sulfur dioxid, combine to form a compound of sulfur trioxid and an oxid of nitrogen. I have not analyzed this compound, but its composition is said to be represented by the formula $(N_2O_3)(SO_3)_2$; and I have reason to believe that this formula correctly indicates its composition. This compound in the gaseous state is carried by the current of air or gases to the condensing system F, containing concentrated sulfuric acid supplied from the reservoir H. The said compound, on coming in contact with the concentrated sulfuric acid, is rapidly absorbed, forming a solution which when very concentrated will solidify at a low temperature. I prefer, however, not to permit this solution to reach the solidifying point, as that would require removal and manipulation of a solid instead of a liquid. The strong but liquid solution of $(N_2O_3)(SO_3)_2$ or other compound, in the concentrated sulfuric acid formed in F flows down by gravity into the reservoir M and is thence transferred continuously by gravity as formed, through the tube L and valve J to the vaporizing apparatus I, which is maintained at a temperature slightly below the boiling point of concentrated sulfuric acid. Water from the reservoir E is admitted to the apparatus in quantity exactly sufficient to form concentrated sulfuric acid from the compound of sulfur trioxid and oxid of nitrogen, the reaction being probably represented by the following equation:

$$(N_2O_3)(SO_3)_2 + 2H_2O = 2H_2SO_4 + N_2O_3.$$

At the temperature approximating that of boiling concentrated sulfuric acid, which is maintained in the vaporizer I, the $N_2O_3$ and any NO or $NO_2$ or $N_2O_5$ which may be present are driven off and drawn by the exhaust fan back into the reaction chamber, where they again take part in the oxidation of additional sulfur dioxid, functioning therefore as oxygen carriers. The removal of the nitrogen oxids may be facilitated by allowing some air to be drawn through the inlet valve R and thence through the vaporizer.

The arrangement of apparatus indicated in Fig. 1 is essentially diagrammatic and is not intended to show practical details or proportions of parts, but is merely for the purpose of elucidating the chemical manipulation and the manner of carrying out the process.

It is evident that the above described details of manipulation may be widely varied without departing from my invention. For example I might use a detachable condenser, and remove the absorbed $(N_2O_3)(SO_3)_2$ in the solid state, treating it subsequently with water in a separate retort or vaporizing system; but I prefer the general arrangement and manipulation herein described.

The reaction may also be carried out by bringing a mixture of air, sulfur dioxid, and a higher oxid of nitrogen at a sufficiently high temperature in contact with, or passing such a mixture through, concentrated sulfuric acid; and treating the resulting solution with water at or near the boiling temperature of concentrated sulfuric acid.

It is further evident that pure oxygen may be used instead of air.

Fig. 2 illustrates a modified type of apparatus wherein a single source of heat may serve for all the requirements of the process. The reference characters in this figure designate the same elements as in Fig. 1. Thus heat from the furnace Q is applied directly to heating the vaporizer I, which in this case is in the form of a horizontal tubular boiler of acid-proof construction. The furnace gases, after heating the vaporizer, are still sufficiently hot to maintain the reaction chamber A at the desired temperature, and are then passed through a counter-current heater N in which they give up their final available heat to the inflowing mixture of air and sulfur dioxide, which mixture is thereby pre-heated before entering the reaction chamber. The condenser F, as illustrated in this figure, is in the form of an acid tower, a vertical cylindrical chamber containing broken earthenware or tiling to which concentrated sulfuric acid from the reservoir H is continuously supplied. This acid having taken up a sufficient proportion of the compound of sulfur trioxid and an oxid of nitrogen, flows through the liquid seal L to the vaporizer I. The oxids of nitrogen driven off in the vaporizer flow to the reaction chamber A through tube D, the essential features of the operation being therefore in all respects as already described in connection with Fig. 1.

I claim:—

1. The process of making sulfuric acid, which consists in heating a mixture of air, sulfur dioxid and an oxid of nitrogen, absorbing the gaseous reaction products in concentrated sulfuric acid, and subsequently removing oxids of nitrogen therefrom and recovering concentrated sulfuric acid.

2. The process of making sulfuric acid, which consists in heating a mixture of air, sulfur dioxid and an oxid of nitrogen, absorbing the gaseous reaction products in concentrated sulfuric acid, and subsequently heating and adding water to the resulting solution to liberate the oxids of nitrogen and produce concentrated sulfuric acid.

3. The process of making sulfuric acid, which consists in forming a solution of a compound of sulfur trioxid with an oxid of nitrogen in concentrated sulfuric acid, converting the said compound into concentrated sulfuric acid and an oxid of nitrogen and recovering and re-using the oxid of nitrogen.

4. The process of making sulfuric acid, which consists in heating a mixture of air, sulfur dioxid and an oxid of nitrogen to produce sulfur trioxid and nitrogen trioxid, absorbing the products in concentrated sulfuric acid, the solution being maintained in the liquid state, and subsequently heating the solution and adding water thereto, whereby the oxid of nitrogen is liberated for re-use and concentrated sulfuric acid is produced.

In testimony whereof I affix my signature.

CHARLES J. REED.